No. 772,717. PATENTED OCT. 18, 1904.
B. KITTLER.
APPARATUS FOR REMOVING WATER FROM PEAT.
APPLICATION FILED MAR. 19, 1904.
NO MODEL.

Witnesses:
Arthur Gunyer
Frederick Unpicht

Inventor:
Bernhard Kittler
by Frank V. Briesen Atty.

No. 772,717. Patented October 18, 1904.

UNITED STATES PATENT OFFICE.

BERNHARD KITTLER, OF MEMEL, GERMANY.

APPARATUS FOR REMOVING WATER FROM PEAT.

SPECIFICATION forming part of Letters Patent No. 772,717, dated October 18, 1904.

Application filed March 19, 1904. Serial No. 198,893. (No model.)

*To all whom it may concern:*

Be it known that I, BERNHARD KITTLER, a citizen of Germany, residing at Memel, Germany, have invented new and useful Improvements in Apparatus for Removing Water from Peat, of which the following is a specification.

This invention relates to an improved apparatus for continuously removing water from peat by electro-osmotic action.

As heretofore practiced, it was not feasible to remove the water from peat when the thickness of the latter exceeded five centimeters. The utility of the product so obtained is, however, limited, and, further, as but a comparatively small quantity of water could be removed by the electro-osmotic action it was not possible to remove cold-producing by-products, such as ammonia.

By my invention large quantities of peat may be treated and the cold-producing constituents may be removed.

In carrying my invention into effect the peat is agitated and subjected jointly to electro-osmotic action and to heat. In this way the water is moved from the positive to the negative pole, while the cold-producing and the water-combining constituents are liberated. The action of the heat in combination with osmose may be considerably intensified by rarefying the air within the apparatus. By the means described a thorough and uniform discharge of the water is obtained, such water carrying away with it all the cold-producing chemical constituents which are separated by means of the heat and from which useful by-products may subsequently be obtained. To carry out the invention in a practical manner and to prevent incrustation at the positive pole, the latter is brought constantly into intimate contact with fresh particles of peat.

Figure 1:
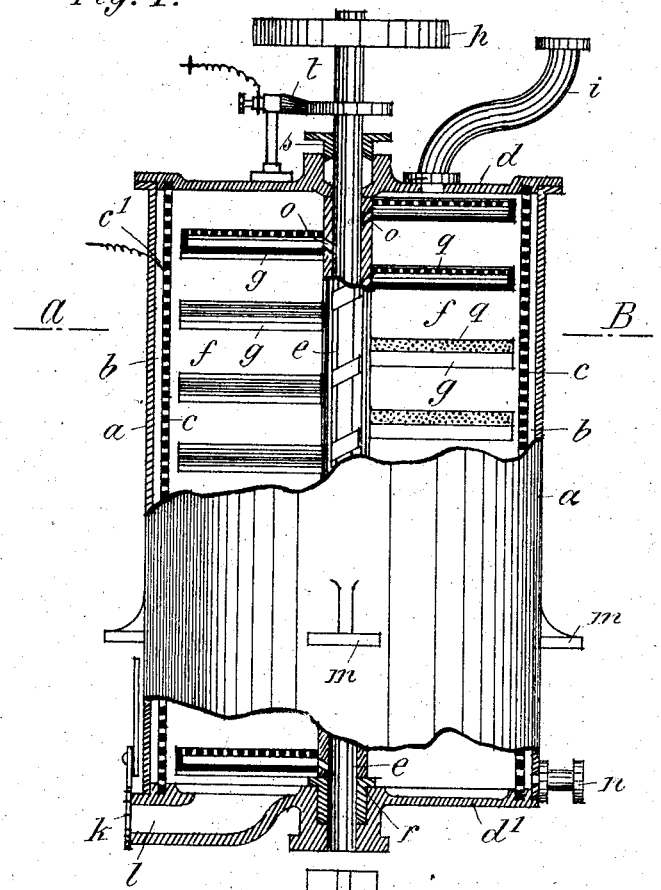
Figure 2:
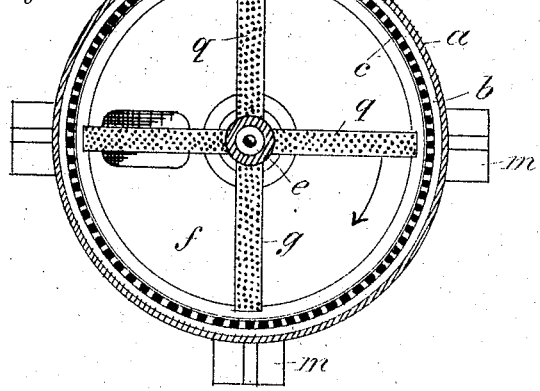

In the accompanying drawings, Figure 1 is a vertical section, partly in elevation, of my improved apparatus for removing water from peat; and Fig. 2 is a cross-section on line A B, Fig. 1.

The apparatus consists of an outer casing or container $a$, provided with feet or brackets $m$, that are supported upon a brick foundation. Within the casing $a$ is fitted a cylindrical strainer $c$ of such dimensions as to form an intervening annular chamber $b$. The top and bottom of casing $a$ are adapted to be closed by covers $d$ $d'$. To the upper cover, $d$, is connected the inlet-pipe $i$ for the peat, while the lower cover, $d'$, has a discharge pipe or opening and a step-bearing $r$. The pipe $l$ may be closed by a lid $k$.

Through a stuffing-box $s$ of cover $d$ projects into casing $a$ a central hollow shaft $e$, carrying agitator-arms $g$. These arms are arranged helically around the shaft and have parallel inclined upper and lower sides to constitute conveyers. Each arm is trough-shaped or hollow, its upper side being covered by a strainer $q$, while the interior of the arm communicates with the interior of the tubular shaft $e$ by means of an opening or port $o$. The shaft $e$ is open at the bottom for the ingress of heated air, which rises through the shaft and passes thence through ports $o$, arms $g$, and strainers $q$ to the interior of the casing $a$.

The shaft $e$, driven from a pulley $h$ or otherwise, is in electric connection, by means of a brush $t$ or the like, with the positive pole of a source of electricity while the cylindrical strainer $c$ is connected at $c'$ to the negative pole of the same circuit. The covers $d$ $d'$ are suitably insulated from the shaft $e$ and the strainer $c$. The casing $a$ has a nipple $n$ communicating with chamber $b$ and connected to a vacuum-pump. (Not shown.)

When the discharge-pipe $l$ has been closed by the lid $k$, the apparatus is filled with peat through pipe $i$ and the agitators are caused to rotate. Simultaneously the tubular shaft $e$ is supplied with hot air and the vacuum-pump is started. The action of the pump produces a difference in pressure between the interior $f$ of the strainer and the annular chamber $b$. Consequently the hot air will pass through the peat, and the electric current passing through the agitator-arms $g$ will come simultaneously into contact with all the particles of the peat. Thus the current and the heated air act together upon every particle of the peat, while the partial vacuum in chamber $b$ will cause a constant discharge of water, together with the chemical constituents in solution, through the strainer *c* into the chamber *b*, from whence the liquid is sucked by the action of the pump through nipple *n*. The helical arrangement of the agitator-arms *g* causes the peat to descend, so that a compact mass of peat will be supported upon the bottom of the casing and will fill the discharge-pipe *l*. After the peat has attained a certain density the lid *k* is opened to discharge the finished product, while fresh peat is continued to be introduced through pipe *i*. The lower strata of the peat are of such density that air will not enter through the open pipe *l*. The only air that enters is that which has been previously heated and which operates upon the peat mechanically as well as by its heat.

In my apparatus individual particles of peat cannot remain in contact with the poles, as they are kept in constant motion, so that an energetic operation is insured. The current passes from the rotatory agitators and radiates through the peat toward the cylindrical strainer, so that by these means incrustation at the positive pole and short-circuiting are prevented.

By my apparatus I am enabled to treat large quantities of peat, and I obtain a superior product because the cold-producing constituents are removed, while, furthermore, any values present may be recovered from the liquid discharged.

What I claim is—

1. An apparatus for treating peat composed of a casing, an inclosed sieve, a rotatory shaft within the casing, agitator-arms on said shaft, means for admitting hot air to the casing, and electric connections on the shaft and sieve, substantially as specified.

2. An apparatus for treating peat composed of a casing, an inclosed sieve to form an intervening annular space, means for exhausting the air from said space, a hollow rotatory shaft within the casing, perforated hollow arms communicating therewith, and electric connections on the shaft and sieve, substantially as specified.

In testimony whereof I have signed my name to this specification in the presence of two subscribing witnesses.

BERNHARD KITTLER.

Witnesses:
N. HAUNKE,
S. BURCKE.